(12) United States Patent
Johnston, Sr. et al.

(10) Patent No.: US 7,044,049 B2
(45) Date of Patent: May 16, 2006

(54) FRYING APPARATUS

(76) Inventors: Joseph H. Johnston, Sr., 4511 Highway 212 East, Monticello, GA (US) 31064; Joseph H. Johnston, Jr., 5472 Concord Cir., Gainesville, GA (US) 30507

( * ) Notice: Subject to any disclaimer, the term of this patent is extended or adjusted under 35 U.S.C. 154(b) by 92 days.

(21) Appl. No.: 10/658,318

(22) Filed: Sep. 9, 2003

(65) Prior Publication Data
US 2005/0051035 A1    Mar. 10, 2005

(51) Int. Cl.
*A47J 37/00* (2006.01)
(52) U.S. Cl. .............................. 99/337; 99/339; 99/645; 126/386.1; 126/385.1
(58) Field of Classification Search .................. 99/337, 99/645, 403, 407, 339, 340; 126/383.1, 385.1, 126/386.1, 299 C
See application file for complete search history.

(56) References Cited

U.S. PATENT DOCUMENTS

| | | | | |
|---|---|---|---|---|
| 53,421 A | * | 3/1866 | Dembois | 126/384.1 |
| 1,766,797 A | * | 6/1930 | Nakagawa | 126/385.1 |
| 5,033,453 A | * | 7/1991 | Loyd et al. | 126/377.1 |
| 5,193,524 A | * | 3/1993 | Loyd et al. | 126/374.1 |
| 5,813,321 A | * | 9/1998 | Bourgeois | 99/340 |

* cited by examiner

Primary Examiner—Reginald L. Alexander
(74) Attorney, Agent, or Firm—Judy Jarecki-Black

(57) ABSTRACT

The present invention relates generally to a frying apparatus and, in particular, to a frying apparatus comprising a cooking container for containing oil or the like for cooking a turkey, a chicken, or seafood; a shield for shielding the operator from oil splatters and preventing the over-spill of the oil from the cooking container; a supporting stand for holding the cooking container; and a plurality of securing straps for securing the cooking container to the supporting stand such that the cooking container is stably positioned onto the supporting stand of the frying apparatus. One embodiment of the present invention contemplates a cooking container generally configured to removably receive the shield such that the shield, when inserted into the open end of the cooking container securely adjoins and abuts the cooking container so that oil does not spill-over between the shield and the cooking container. However, the present invention also contemplates a frying apparatus having a shield made as a unitary piece with the cooking container.

7 Claims, 3 Drawing Sheets

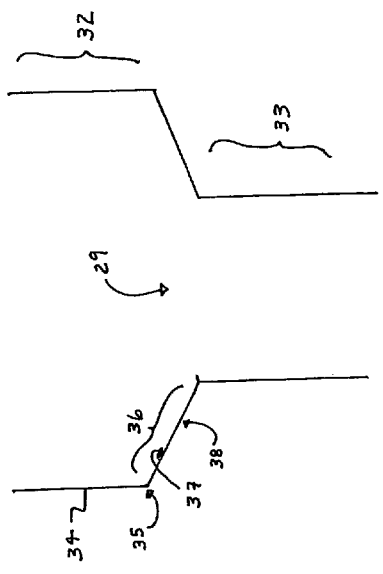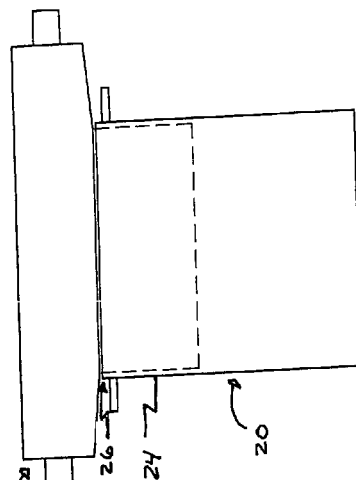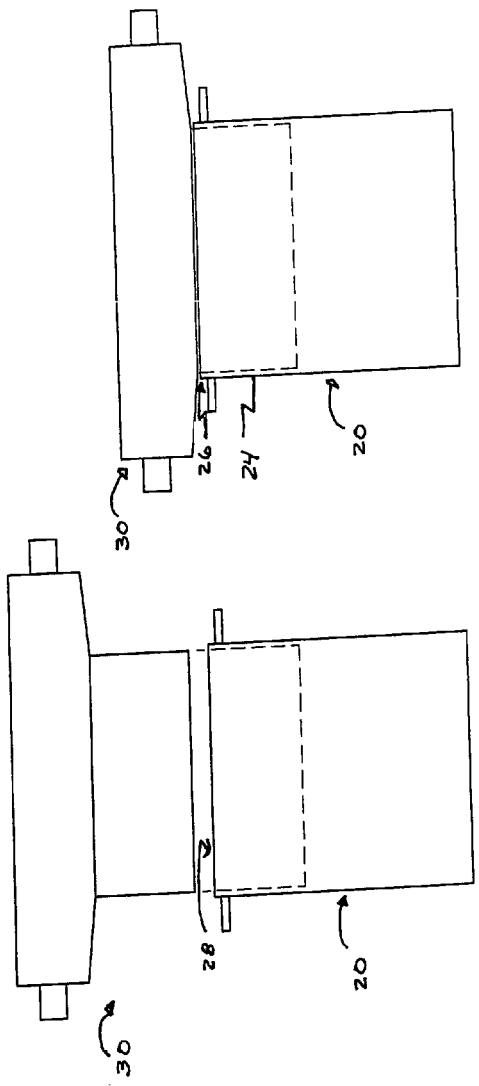

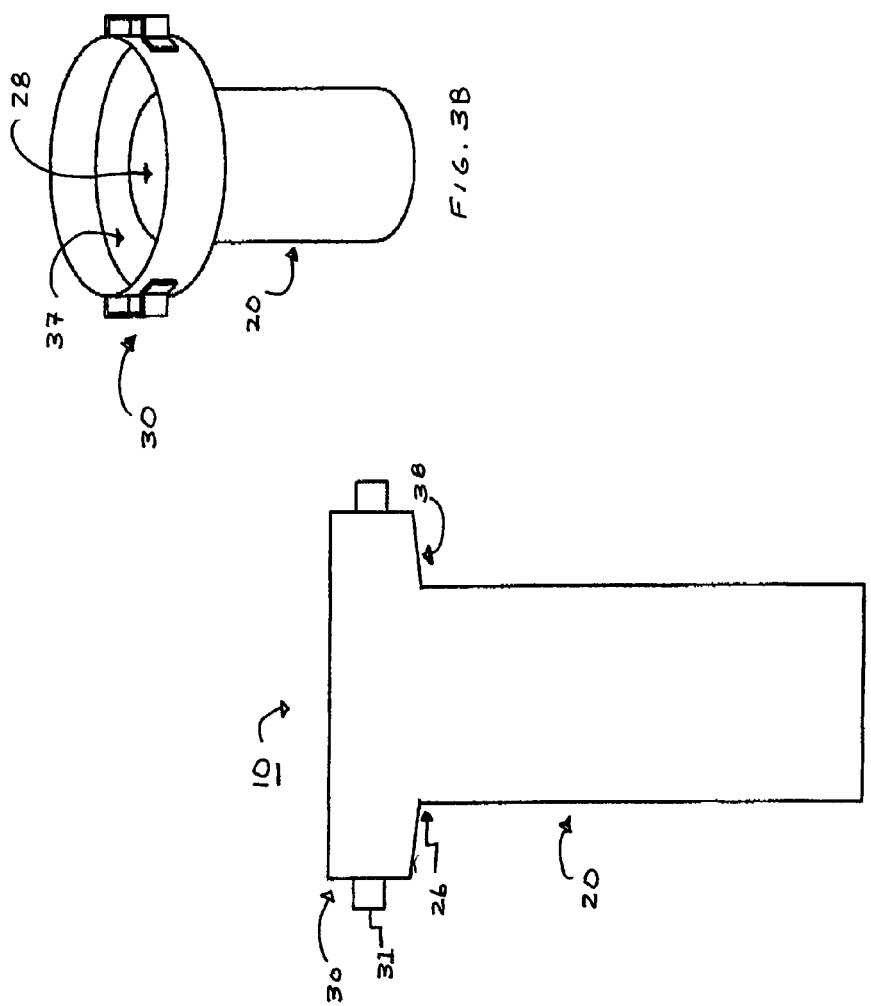

FRYING APPARATUS

FIELD OF THE INVENTION

The present invention relates generally to a frying apparatus particularly suited for frying poultry such as a turkey, a chicken, and the like. In particular, the deep-frying apparatus of the present invention comprises a cooking container, a supporting stand, and a shield securely abutting and adjoining the top of the cooking container. The frying apparatus further includes securing straps connecting on one end to the cooking container and, on the other end, connecting to the supporting stand such that the cooking container is stably positioned onto the stand of the frying apparatus.

BACKGROUND OF THE INVENTION

Conventional food fryers are well known in the prior art. Typical deep-fryers include a container in which oil is heated and a poultry rack or food support on which food items are placed and then lowered into the container of heated oil for cooking. For example, the Turkey Fryer Complete Kit available at www.turkey-fryer-online.com consists of a fryer pot having a capacity of from 26 quarts to 32 quarts, a lid, a poultry rack or basket, and a stand having a burner as a source for heating the oil to a sufficient temperature for frying a turkey.

Although deep-fat fryers have become increasingly popular as a way to cook turkey, chicken, and even seafood, they have been increasingly criticized as a safety hazard. One serious problem with conventional fryers, for example, may result when an operator puts a turkey or other food item into heated oil typically reaching a temperature of 350 degrees F. or more. When inserting frozen or partially-frozen food items or items containing moisture into the hot oil, the high temperature causes the moisture to flash off the food items resulting in bubbling-up of the oil and potentially a spill-over of the hot oil into the flames of the burner unit. The spill-over of even a small amount of oil into the flames can result in a disastrous fire.

Underwriter's Laboratories (UL), an independent non-profit product safety testing laboratory, found another major problem associated with conventional turkey fryers. Conventional containers are not stably attached to their support stands, thereby allowing the container to easily separate from the stand and tip over permitting oil to spill out. If the oil is hot, the operator and anyone nearby could be severely burned. UL was so concerned about this and the other potential safety problems of conventional turkey fryers that they refused to certify the entire product line—an action never before taken by the group (see www.wral.com/money/1565168/detail.html, Jul. 18, 2002).

Because of these deficiencies and others inherent in conventional turkey fryers, it would be advantageous to provide a frying apparatus having increased stability especially one having a means for decreasing or preventing oil splatters from spilling-over onto the burner units.

SUMMARY OF THE INVENTION

Briefly described, the present invention relates to a deep-frying apparatus comprising a cooking container for containing oil or the like for cooking a turkey, a chicken, or seafood; a shield for shielding the operator from oil splatters and preventing the over-spill of the oil from the cooking container; a supporting stand for holding the cooking container and further for providing a source for heating the oil or other cooking medium to a temperature suitable for cooking the food item; and a plurality of securing straps for securing the cooking container to the supporting stand such that the cooking container is stably positioned onto the supporting stand of the frying apparatus.

In one embodiment of the present invention, a shield is provided that is adapted for use with existing cooking containers suitable for the high temperature heating of the desired cooking medium, such as oil, and having dimensions such that the shield may be easily inserted into, and removed from, the cooking container and, when inserted, securely adjoins and abuts the upper edge of the cooking container so that oil does not spill between the lower edge of the shield and the upper edge of the container. The shield further comprises a ring-shaped top surface partially extending across the open end of the cooking container such that oil is prevented from splattering up and spilling-over the top of the cooking container. In one embodiment of a shield made according to the present invention, the top surface of the shield extends in a horizontal plane across the top surface of the cooking container and is perpendicular to the vertical axis of the container. However, also contemplated to be encompassed with in the scope of the present invention is a shield having a ring-shaped top surface that slants downwardly as it extends across the top of the cooking container thereby causing oil that splatters or spills on the top surface of the shield to flow downwardly into the cooking container by means of gravity, thereby preventing the over-spill of the oil down the sides of the container.

Another embodiment of a frying apparatus made according to the present invention provides a cooking container having a shield as an integral part of the cooking container, such that the container and shield are made as one piece.

Yet another embodiment of a frying apparatus made in accordance with the present invention contemplates a cooking container having a shield and, further comprising a supporting stand capable of removeably receiving the cooking container and useful for increasing the stability of the frying apparatus. A frying apparatus made according to this embodiment may further comprise a plurality of supporting straps to aid in stabilizing the positioning of the cooking container onto the supporting stand and thereby reducing the possibility the cooking container will be unintentionally knocked off of the supporting stand.

These and other objects, features, and advantages of the present invention will become more apparent upon review of the detailed description set forth below when taken in conjunction with the accompanying figures, which are briefly described as follows.

BRIEF DESCRIPTION OF THE FIGURES

A full and enabling disclosure of the present invention, including the best mode thereof, to one of ordinary skill in the art, is set forth more particularly in the remainder of the specification, including reference to the accompanying figures, wherein:

FIG. 2 illustrates one embodiment of a frying apparatus made in accordance with the present invention wherein FIGS. 2A and 2B show a detailed view of a shield for use with an existing cooking container and having dimensions such that the shield, when inserted into the conventional cooking container as illustrated in FIG. 2C, securely adjoins and abuts the upper edge of the cooking container; and FIG. 3 illustrates another embodiment of a frying apparatus made in accordance with the present invention and comprising a shield configured as an integral part of the cooking container such that the container and shield are made as one piece. FIG. 3A depicts a side view of this embodiment while a top view is depicted in FIG. 3B.

DETAILED DESCRIPTION OF PREFERRED EMBODIMENTS

Figure 1:
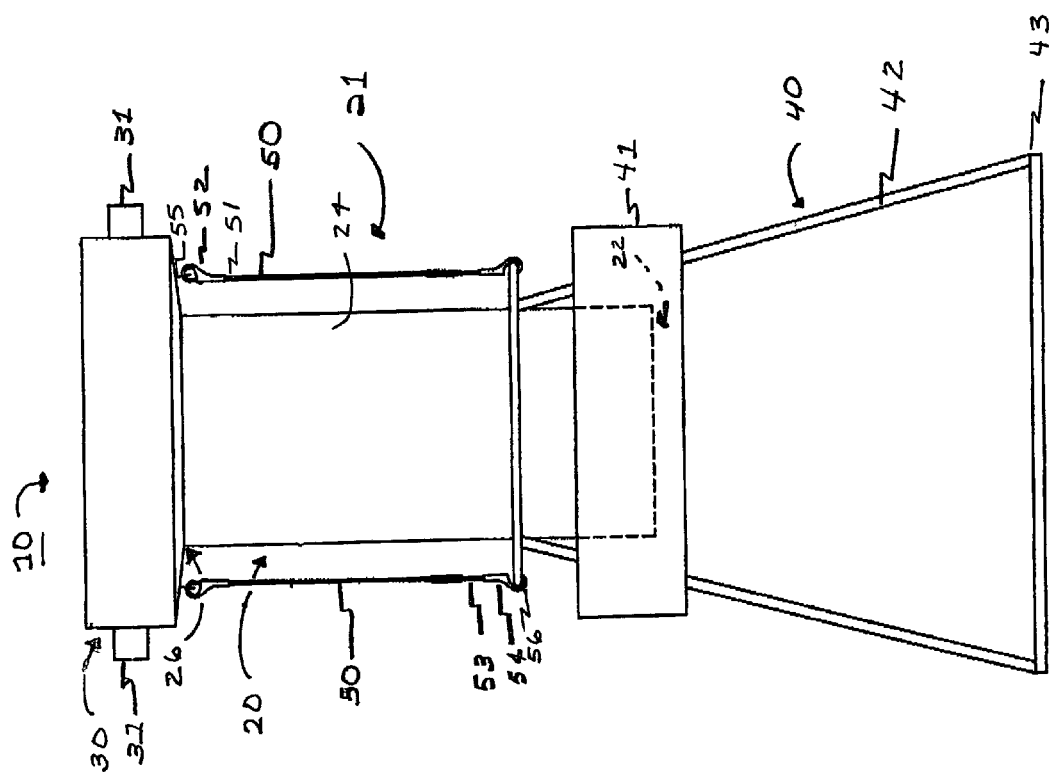
FIG. 1 illustrates a frying apparatus generally made in accordance with the present invention and comprising a cooking container for containing oil for cooking a food item; a shield for shielding the operator from oil splatters and preventing the over-spill of the oil from the cooking container; a supporting stand for holding the cooking container and a plurality of securing straps for securing the cooking container to the supporting stand such that the cooking container is stably positioned onto the supporting stand of the frying apparatus.

Other objects, features and aspects of the present invention are disclosed in, or are obvious from, the following Detailed Description. It is to be understood by one of ordinary skill in the art that the present discussion is a description of exemplary embodiments only and is not intended as limiting the broader aspects of the present invention, which broader aspects are embodied in the exemplary construction. In fact, it will be apparent to those skilled in the art that various modifications and variations can be made in the present invention without departing from the scope or spirit of the invention. For instance, features illustrated or described as part of one embodiment can be used in another embodiment to yield a still further embodiment. It is intended that the present invention cover such modifications and variations as come within the scope of the appended claims and their equivalents.

For convenience, certain terms employed in the Specification, Examples, and appended Claims are collected here.

As used herein, terms such as "horizontal" and "vertical" are not intended to be strictly construed in describing the invention. A "horizontal" member could have only a general horizontal configuration and a "vertical" member could have only a general vertical configuration.

As used herein, the term "a" should be construed as one or more.

The present invention generally provides a deep-frying apparatus comprising a cooking container for containing oil for cooking a turkey, a chicken, or seafood; a shield for shielding the operator from oil splatters and preventing the over-spill of the oil from the cooking container; a supporting stand for holding the cooking container; and a plurality of securing straps for securing the cooking container to the supporting stand such that the cooking container is stably positioned onto the supporting stand of the frying apparatus.

One embodiment of a frying apparatus made in accordance with the present invention is broadly illustrated in FIG. 1. Frying apparatus 10 generally comprises cooking container 20 for holding oil or other cooking medium for cooking a turkey or other food item; shield 30 configured to reduce or prevent the overspill of oil from the cooking container; supporting stand 40 for holding the cooking container and further for providing a source for heating the oil to a temperature suitable for cooking the food item; and a plurality of securing straps 50 for securing the cooking container to the supporting stand such that the cooking container is stably positioned onto the supporting stand. Optionally, the frying apparatus may further comprise a handle, generally indicated as 31 and positioned on cooking container 20, shield 30, or both.

Cooking container 20 is generally cylindrical in shape and comprises a bottom surface 22 and a sidewall 24 that extends upwardly from the bottom surface 22 to a top edge 26 of the sidewall 24. The bottom surface 22 and sidewall 24 define interior opening 28 of cooking container 20.

Frying apparatus 10 of the present invention may further comprise a supporting stand 40 extending downwardly from the cooking container 20 as illustrated, for example, in FIG. 1. Supporting stand 40 may be configured to removably receive cooking container 20 or, alternately, may be attached to cooking container 20. One embodiment of supporting stand 40, for example, is configured to have at least three legs disposed around cooking container 20 thereby providing stability to frying apparatus 10. An alternate embodiment of the present invention contemplates supporting stand 40 comprising receptacle 41 for receiving cooking container 20; a stabilizer ring 43 for stabilizing the supporting stand, and a plurality of struts 42 connecting the stabilizer ring to the receptacle. However it should be understood that any conventional means of support capable of supporting cooking container 20 and configured to increase the stability of frying apparatus 10 may be used in a fryer apparatus without departing from the scope of the present invention.

Also as generally illustrated in FIG. 1, frying apparatus 10 further comprises a plurality of securing straps 50, each strap having a first end 51 and a second end 53, each strap further comprising a means of attachment at both first end 51 and the second 53 such that a first means of attachment 52 on first end 51 of supporting strap 50 attaches to a first receptacle 55 on the frying apparatus of the present invention. In one embodiment, first receptacle 55 is positioned on cooking container 20, however, the present invention also contemplates first receptacle 55 to be attached to shield 30. A second means of attachment 54 on second end 53 of each of securing straps 50 attaches to second receptacle 56 on supporting stand 40, thereby stabilizing the positioning of cooking container 20 onto supporting stand 40.

Attachment means 52 and 54 may comprise any conventionally known means of attachment such as, but not limited to, a J-shaped hook, a U-shaped hook, a clip, and the like. It should also be recognized that, while attachment means 52 may be of the same type as attachment means 54, the present invention also contemplates that attachment means 52 may be of a different type from that used as attachment means 54. Similarly, first receptacle 55 and second receptacle 56 may comprise any complementary shape that is selectively connectable to attachment means 52 and attachment means 54, respectively. For example, one type of receptacle useful in the present invention is an inverted U-shaped hook, however, there can be any number of receptacles and selectively connectable attachment means without departing from the scope of the present invention.

Referring now to FIG. 2A, shield 30 is generally illustrated and comprises an upper portion 32 and a lower portion 33, wherein the upper portion 32 comprises a sidewall 34 having a lower edge 35 and a bottom 36, said bottom 36 having a traversing hole 29, an upper surface 37 connected to the lower edge 35 of side wall 34, and a lower surface 38. In one embodiment of the present invention, illustrated generally in FIG. 2B, cooking container 20 is generally configured to removably receive shield 30 such that shield 30, when inserted into interior opening 28 of the cooking container as illustrated in FIG. 2C, securely adjoins and abuts top edge 26 of side wall 24 of the cooking container so that oil does not spill-over between shield 30 and cooking container 20.

FIG. 3 generally illustrates another embodiment of a frying apparatus made in accordance with the present invention, wherein shield 30 comprises a unitary piece integral with cooking container 20. As shown in greater detail in FIG. 3A, top edge 26 of cooking container 20 is contiguous with the lower surface 38 of shield 30 thereby providing a frying apparatus comprising a shield as an integral part of the cooking container.

FIG. 3B illustrates shield 30 in greater detail, whether the cooking container is generally configured to removably receive the shield or, as in an alternate embodiment of the present invention, the shield is provided as an integral and unitary part of the cooking container. Shield 30 is disposed relative to cooking container 20 so as upper surface 37 partially extends across interior opening 28 such that splattering up or spilling-over of the oil or other cooking medium can be reduced or prevented altogether. In one embodiment of the present invention, upper surface 37 of shield 30 is downwardly slanting toward interior opening 28 to promote oil, which has splattered or spilled-over onto the upper surface, to flow by gravity downwardly to interior opening 28 thereby reducing oil spillage.

In various embodiments of the present invention, each of the component parts of frying apparatus 10 may be constructed of metal such as, but not limited to, stainless steel, carbon steel, aluminum, and the like. However, one of skill in the art will recognize that any material may be used for construction of frying apparatus 10 that is capable of withstanding heating to a high enough temperature necessary for deep-frying food. It is also contemplated to be within scope of the present invention to have all of the components of frying apparatus 10 to be constructed of metal except securing straps 50 which, in one embodiment, are made from a non-metal, preferably heat-resistant, material such as a plastic including, but not limited to, polyethylene, polypropylene, high-density polyethylene (HDPE), polyethylene terephtalate (PET), polystyrene, and the like and combinations thereof.

While the present invention has been described with reference to specific features and embodiments, such description is for illustrative purposes only. The words used are words of description rather than of limitation. For example, numerous other constructions of dispensing containers having a funnel overlay with the ability to reverse to form a funnel for dispensing the contents thereof are contemplated to be within the scope of the present invention. It is to be understood that changes and variations may be made by those of ordinary skill in the art without departing from the spirit or scope of the present invention, which is set forth in the following claims.

What is claimed is:

1. A frying apparatus comprising:
   a) a cooking container having a bottom surface and a side wall, the side wall extending upwardly from the bottom surface to a top edge of the side wall, the bottom surface and the side wall defining an interior volume of the container;
   b) a shield comprising an upper portion and a lower portion, wherein the upper portion comprises a sidewall having an interior surface, a lower edge, and a bottom, said bottom having a ring-shaped traversing hole, an upper surface connected to the lower edge of the side wall, and a lower surface and wherein the lower portion of the shield has a sidewall having an upper edge connected to the lower surface of the bottom;
   c) a supporting stand; and
   d) a securing means disposed to secure the cooking container to the supporting stand, wherein the securing means is a plurality of straps.

2. The frying apparatus according to claim 1, wherein the securing means has a first end and a second end, said first end and said second end each having a means of attachment.

3. The frying apparatus according to claim 2, wherein the means of attachment on first end of supporting strap is removably attached to a first receptacle of the cooking container.

4. The frying apparatus according to claim 2, wherein the means of attachment on the first end of supporting strap is removably attached to a first receptacle of the shield.

5. The frying apparatus according to claim 2, wherein the means of attachment on the second end of each supporting strap attaches to a receptacle on the supporting stand.

6. A frying apparatus comprising:
   a) a cooking container having a bottom surface and a side wall, the side wall extending upwardly from the bottom surface to a top edge of the side wall, the bottom surface and the side wall defining an interior volume of the container;
   b) a shield comprising an upper portion and a lower portion, wherein the upper portion comprises a sidewall having an interior surface, a lower edge, and a bottom, said bottom having a traversing hole, an upper surface connected to the lower edge of the side wall, and a lower surface and wherein the lower portion of the shield has a side wall having an upper edge connected to the lower surface of the bottom, and wherein the bottom of the shield is downwardly sloping; wherein the sidewall of the lower portion of the shield is configured to be removably received by the cooking container;
   c) a supporting stand;
   d) a securing means disposed to secure the cooking container to the supporting stand, wherein the securing means is plurality of straps, each strap having a first end and a second end, said first end and said second end each having a means of attachment, and wherein the means of attachment on first end of the securing means is removably attached to a first receptacle of the frying apparatus and the means of attachment on the second end of each supporting strap attaches to a receptacle on the supporting stand; and
   e) at least one handle adapted for manually carrying the container by the handle.

7. The frying apparatus according to claim 6 further comprising a lid, wherein the lid covers the upper portion of the shield.

* * * * *